(12) United States Patent
Kim et al.

(10) Patent No.: US 9,783,154 B2
(45) Date of Patent: Oct. 10, 2017

(54) PASSIVE HOOD HINGE SYSTEM FOR VEHICLE

(71) Applicants: Hyundai Motor Company, Seoul (KR); Kia Motors Corporation, Seoul (KR)

(72) Inventors: Sang Il Kim, Gyeonggi-do (KR); Seong Tae Hong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/205,458

(22) Filed: Jul. 8, 2016

(65) Prior Publication Data

US 2017/0113648 A1    Apr. 27, 2017

(30) Foreign Application Priority Data

Oct. 26, 2015 (KR) .................. 10-2015-0148463

(51) Int. Cl.
*B60R 21/38* (2011.01)
*E05D 3/06* (2006.01)
(Continued)

(52) U.S. Cl.
CPC ............... *B60R 21/38* (2013.01); *E05D 3/06* (2013.01); *E05D 5/0207* (2013.01); *E05D 5/062* (2013.01);
(Continued)

(58) Field of Classification Search
CPC ......... E05D 3/06; E05D 5/0207; E05D 5/062; B60R 21/38; Y10T 16/521
See application file for complete search history.

(56) References Cited

U.S. PATENT DOCUMENTS 6,513,617 B2 * 2/2003 Sasaki .................... B60R 21/38
  16/222
6,543,086 B2 * 4/2003 Bjureblad ............... B60R 21/34
  16/222
(Continued)

FOREIGN PATENT DOCUMENTS

JP    2003-063451    3/2003
JP    2005-112138    4/2005
(Continued)

*Primary Examiner* — Jeffrey O Brien
(74) *Attorney, Agent, or Firm* — Mintz Levin Cohn Ferris Glovsky and Popeo, P.C.; Peter F. Corless

(57) ABSTRACT

A passive hood hinge system for a vehicle is provided. The passive hood hinge system includes a hinge bracket that is coupled to a vehicle body that extends in a vertical orientation and a pin regulation aperture. A hinge arm is coupled with a hood and a descending link has first and second end portions, respectively, rotatably coupled with the hinge arm and the hinge bracket. A support link has first and second end portions respectively, rotatably coupled with the hinge arm and the hinge bracket. A bending lever is disposed at the hinge bracket and has an upper end portion coupled with the descending pin coupled with a pin regulation aperture, and a bent portion that bends when the descending pin at the pin regulation aperture descends. A buffer bracket is disposed at a lower portion of the descending pin and is deformed by pressing the descending pin.

11 Claims, 4 Drawing Sheets

(51) Int. Cl.
*E05D 5/02* (2006.01)
*E05D 5/06* (2006.01)
*E05D 7/00* (2006.01)
*E05D 11/00* (2006.01)

(52) U.S. Cl.
CPC ............ *E05D 7/0009* (2013.01); *E05D 11/00* (2013.01); *E05D 2011/009* (2013.01); *Y10T 16/521* (2015.01)

(56) References Cited

U.S. PATENT DOCUMENTS

| | | | | |
|---|---|---|---|---|
| 6,834,735 B2* | 12/2004 | Kim | ................. | B60R 21/38 180/274 |
| 7,303,040 B2* | 12/2007 | Green | ................. | B62D 25/12 180/274 |
| 7,506,408 B2* | 3/2009 | Lu | ................. | G06F 1/1681 16/337 |
| 7,681,685 B2* | 3/2010 | Herzog | ................. | B60R 21/38 180/274 |
| 7,934,293 B2* | 5/2011 | Kalargeros | ............ | B60R 21/38 16/357 |
| 8,544,590 B2* | 10/2013 | McIntyre | ................. | B60R 21/38 180/274 |
| 8,726,466 B2* | 5/2014 | Kim | ................. | B60R 21/38 16/223 |
| 8,893,354 B2* | 11/2014 | McIntyre | ................. | B60R 21/38 16/288 |
| 8,985,256 B1* | 3/2015 | Yang | ................. | B60R 21/38 180/274 |
| 9,121,212 B2* | 9/2015 | Carothers | ............... | E05F 3/20 |
| 9,366,066 B2* | 6/2016 | Hwang | ................. | E05D 11/00 |
| 9,481,340 B2* | 11/2016 | Kim | ................. | B60R 21/34 |
| 2005/0279550 A1* | 12/2005 | Saville | ................ | B60R 21/38 180/69.21 |
| 2006/0213030 A1* | 9/2006 | Lu | ................. | G06F 1/1681 16/221 |
| 2010/0005628 A1* | 1/2010 | Jung | ................. | B60R 21/34 16/386 |
| 2014/0026369 A1* | 1/2014 | Kim | ................. | B60R 21/38 16/387 |

FOREIGN PATENT DOCUMENTS

| | | |
|---|---|---|
| JP | 2005-112198 | 4/2005 |
| JP | 4191030 B2 | 12/2008 |
| JP | 2013-203138 | 10/2013 |
| JP | 2015-042530 | 3/2015 |
| KR | 10-0348570 B1 | 8/2002 |
| KR | 10-0737959 | 7/2007 |

\* cited by examiner

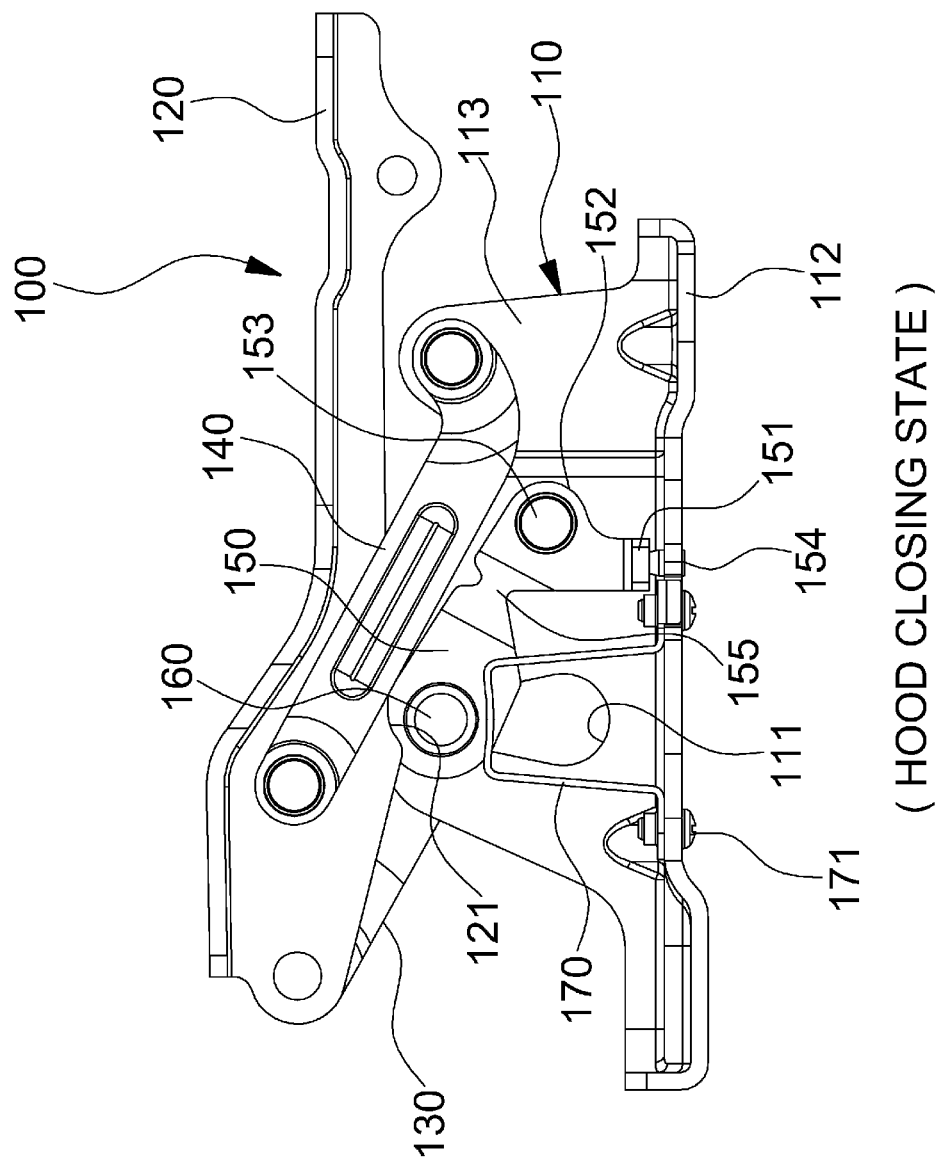
FIG. 3A (HOOD CLOSING STATE)

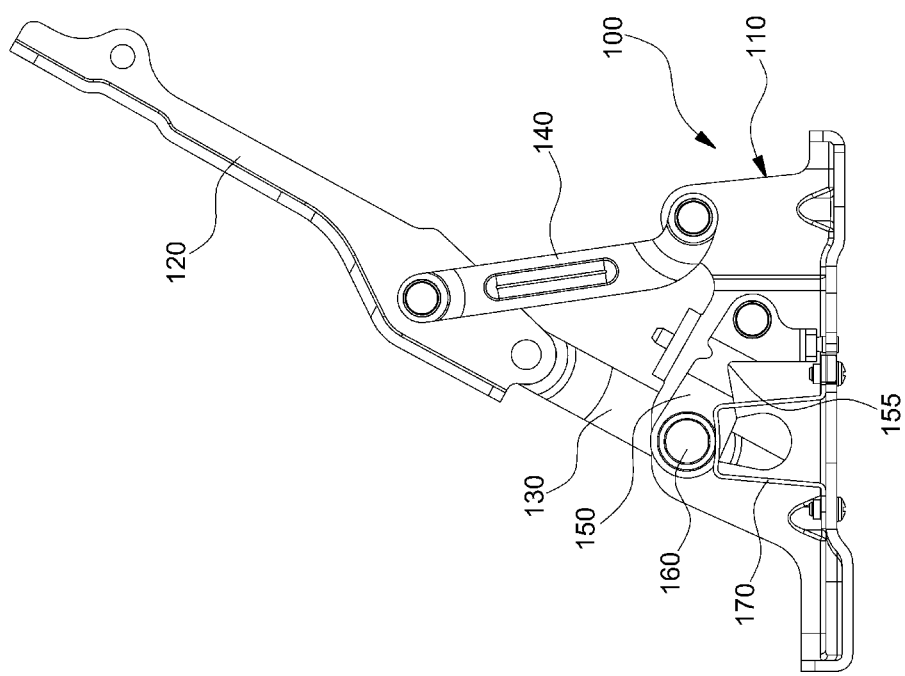
FIG. 3B (HOOD OPENING STATE)

PASSIVE HOOD HINGE SYSTEM FOR VEHICLE

CROSS-REFERENCE TO RELATED APPLICATION

This application claims under 35 U.S.C. §119(a) the benefit of priority to Korean Patent Application No. 10-2015-0148463 filed on Oct. 26, 2015, the entire contents of which are incorporated herein by reference.

BACKGROUND (a) Technical Field

The present disclosure relates to a passive hood hinge system for a vehicle, and more particularly, to a passive hood hinge system for a vehicle capable that reduces injuries to a pedestrian by compressing a hood upon collision into the hood to relieve an impact applied to the pedestrian.

(b) Background Art

Generally, a front portion of a vehicle is provided with an engine compartment which is accessible via a hood. The hood of the vehicle provides access to the engine compartment and provides a shield of the engine compartment to block engine noise. The hood has both left and right sides of a rear end portion coupled with a vehicle body around the engine compartment by a hood hinge assembly to provide access to the engine compartment while being rotated based on the hood hinge assembly.

The existing hood hinge assembly of the related art maintains the rigid position of the hood and thus when a vehicle impacts a pedestrian, the pedestrian's body may be wounded by the impact of the vehicle. Accordingly, various pedestrian protection technologies that comply with pedestrian protection regulations and improvement in vehicle marketability have been developed. For example, an active hood system secures a space between the hood and the engine compartment to absorb impact energy.

The active hood system of the related art is a system that instantly disengages the hood upon the impact to protect the pedestrian and reduces injuries to the pedestrian. For example, the rear end portion (e.g., hood hinge assembly) of the hood is disengaged and elevated to reduce an injury value while mitigating the pedestrian impact. In the existing active hood system, when a crash detecting sensor senses the pedestrian crash, a controller operates an actuator in response to a sensor signal to disengage and elevate the rear end portion of the hood, thereby creating a buffer space between the hood and the engine compartment.

However, the existing active hood system may be problematic due to the non-operation and malfunction of the crash detecting sensor. Further, the current system may excessively increase the cost and weight of the vehicle due to the complex configuration of the controller, the crash detecting sensor, the actuator, or the like.

Conversely, unlike the active hood system that disengages and elevates the hood upward upon the pedestrian crash, a passive hood technology reduces the injury value of the pedestrian by disengaging and vertically translating the hood from an initial position to a second position that is vertical lower than the initial position has been developed. For example, the hood hinge system to dampen the hinge assembly by a spring during the crash occurrence has been proposed. However, the passive hood hinge system has unstable lock performance due to the absence of an impact recognizing component. Accordingly, the system may malfunction and may increase the size, costs, and weight due to the application of the spring.

Further, a method for absorbing energy through a spring does not provide control over a spring constant. In particular to increase an impact absorption amount and secure sufficient energy absorption performance, a length of the spring is required to be extended. As a result, the weight and costs may be increased due to the increase in the size of an impact absorbing component including the spring and the injury value may be increased due to the rebound of the spring. Further, when the spring structure passes through an electro-deposition bath for electro deposition coating, the spring has a functional problem due to the stagnation and deposition of an electro deposition filtrates. For example, the spring is separately assembled in a trim assembling line, etc., thereby limiting vehicle mass production process.

The above information disclosed in this section is merely for enhancement of understanding of the background of the invention and therefore it may contain information that does not form the prior art that is already known in this country to a person of ordinary skill in the art.

SUMMARY

The present invention provides a passive hood hinge system for a vehicle capable of having a reduced size and weight with a simplified structure absent bulky components such as a spring or expensive components such as a controller, a sensor, and an actuator and improves the vehicle mass production processes.

Accordingly, in one aspect, the present invention provides a passive hood hinge system of a vehicle that may include a hinge bracket fixed to a vehicle body and having a pin regulation aperture formed in a vertical direction and a hinge arm coupled with a hood of the vehicle. A descending link having a first end portion may be rotatably coupled with the hinge arm and a second end portion may be rotatably supported to the hinge bracket. A support link may have one end portion rotatably coupled with the hinge arm and may have a second end portion rotatably coupled with the hinge bracket. A bending lever may be disposed at the hinge bracket, having an upper end portion coupled with a descending pin coupled with a pin regulation aperture, and a bent portion may be configured to bend when the descending pin at the pin regulation aperture descends. A buffer bracket may be disposed at a lower portion of the descending pin and may be configured to deform by the pressure of the descending pin. For example, when the hinge arm is dropped to press the descending pin by a load applied through the hood during a pedestrian crash, the descending pin may be displaced while the bent portion may be configured to bend and the buffer bracket may absorb an impact while deformed by the translation of the descending pin.

According to an exemplary embodiment of the present invention, a second end of the descending link may be rotatably coupled with the descending pin to vertically translate the descending link when the descending pin is disengaged from an initial position to a reduced vertical position. Furthermore, according to an exemplary embodiment of the present invention, the pin regulation aperture may include with a neck component to allow the descending pin positioned at the upper portion to be coupled (e.g., fixed or maintain a fixed position with respect to) to the lower portion.

Furthermore, according to an exemplary embodiment of the present invention, the neck component may protrude inwardly from the pin regulation aperture and the width of the pin regulation aperture at a portion where the neck component is formed may be less than (e.g., narrower) than other portions of an upper portion and a lower portion of the neck component. In addition, the width of the pin regulation aperture at the lower portion of the neck component may be greater (e.g., wider) as the pin regulation aperture extends in a distal direction.

The descending pin may be configured to maintain a position by a locking action due to the friction force when descending pin is fitted in the upper portion of the pin regulation aperture. When the descending pin is pressed by the hinge arm during an impact, the descending pin may be displaced toward the portion where the width of the pin regulation aperture is increases.

Furthermore, according to an exemplary embodiment of the present invention, the bending lever may have a lower fastening component coupled with a bottom plate of the hinge bracket to maintain a fixed position. An intermediate portion may be coupled with a vertical plate of the hinge bracket by a pin. An upper portion may be disposed in an inclined direction, the upper portion may extend from the intermediate portion to an upper end portion and may be coupled to the descending pin, in which a first side of the upper potion may be disposed in the inclined direction and may provide a bent portion.

Additionally, an adjust bolt may penetrate through the bottom plate of the hinge bracket to be coupled (e.g., screw-connected) thereto and a body of the adjust bolt may be coupled to a fastening component of the bending lever to adjust a height of the fastening component from the bottom plate of the hinge bracket upon rotation of the adjust bolt. The bent portion may be formed by reducing the width of the bending lever to a greater extent than other portions. Furthermore, according to another exemplary embodiment of the present invention, a thickness of the bending lever at the portion where the bent portion is formed may be thinner (e.g., have a reduced thickness) than other portions. In addition, the buffer bracket may be made of a board bent to have a convex shape, for example, a  shape to enable a lower end portion of both left and right sides to be fixed to the bottom plate of the hinge bracket and an upper portion may be contacted (e.g., have a force applied thereto) by the descending pin.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein:

FIGS. 3A and 3B are an exemplary side views illustrating an ordinary operation state of the passive hood hinge system according to the exemplary embodiment of the present invention.

Figure 1:
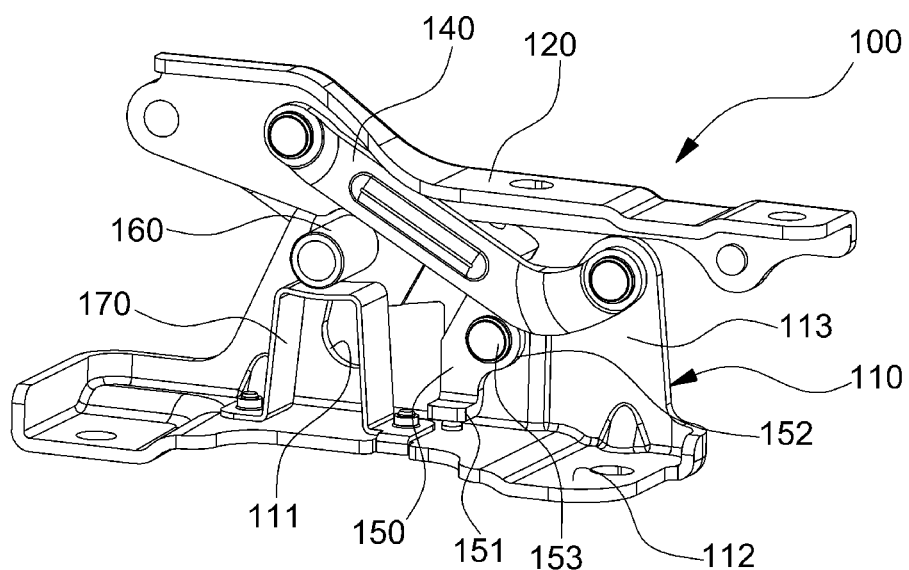
FIGS. 1 and 2 are exemplary perspective view of a passive hood hinge system according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
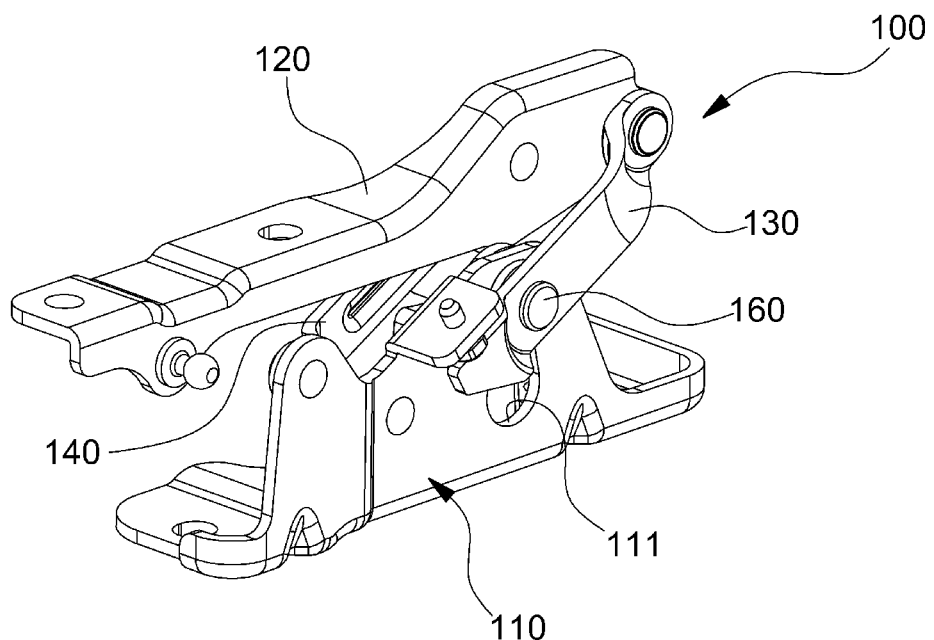
Figure 4:
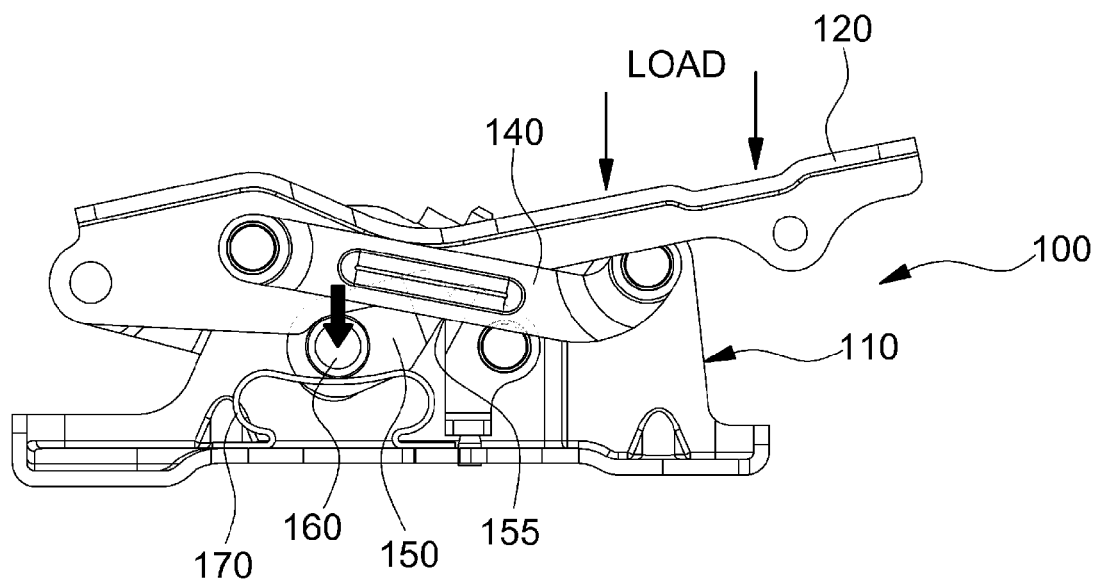
FIGS. 4 and 5 are exemplary state view of the passive hood hinge system when the passive hood hinge system according to an exemplary embodiment of the present invention performs the impact absorbing operation.
Figure 5:
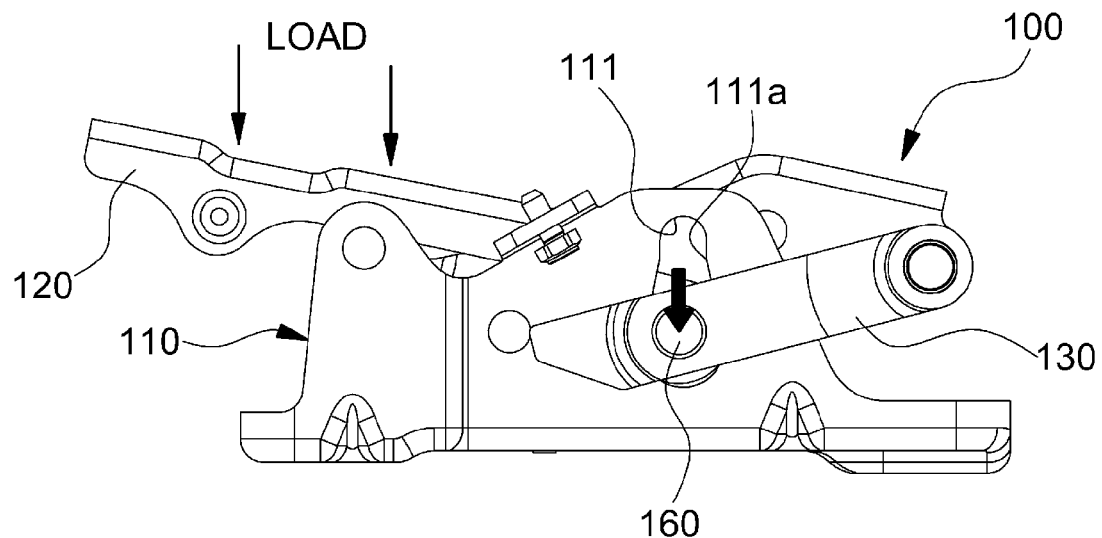

FIGS. 1 and 2 are exemplary perspective views of a passive hood hinge system according to an exemplary embodiment of the present invention and FIGS. 3A-3B is an exemplary side view illustrating an ordinary operation state of the passive hood hinge system according to the exemplary embodiment of the present invention. The left of FIG. 3A illustrates an operation state in the hood closing state and FIG. 3B illustrates an operation state in the hood opening state. Further, FIGS. 4 and 5 are exemplary state views of the passive hood hinge system when the passive hood hinge system performs the impact absorbing operation. Both of FIGS. 4 and 5 are exemplary side views of the hood hinge system that perform the impact absorbing operation, and illustrate the operation states viewed from adjacent sides (e.g., opposite sides) to each other.

A configuration of a passive hood hinge system 100 according to an exemplary embodiment of the present invention will be described. Reference number 110 represents a hinge bracket fixed to a vehicle body (not illustrated) around an engine compartment and reference numeral 120 represents a hinge arm that may be coupled to a hood (not illustrated) and may be configured to rotate when the hood is opened and closed. The hinge arm 120 may be supported by two links rotatably coupled with the hinge bracket 110, a rear end portion that may include a first side of the hinge arm 120 supported by a descending link 130. A second side of the hinge arm 120, may be disposed in a front portion of a connected portion and the descending link may be supported by a support link 140. In particular, an upper end portion of the descending link 130 may be rotatably hinge-connected to a first side of the hinge arm 120 and a lower end portion of the descending link 130 may be rotatably hinge-connected to a descending pin 160 to be rotatably support the hinge bracket 110 side through the descending pin 160.

Further, an upper end portion of the support link 140 may be rotatably hinge-connected to a second side of the hinge arm 12. A lower end portion of the support link 140 may be rotatably hinge-connected to a first side of the hinge bracket 110. The support link 140 and the descending link 130 may be coupled with the hinge arm 120 and an opposite surface of the hinge bracket 110. When the support link 140 is hinge-connected to a first surface of the hinge arm 120 and a first surface of the hinge bracket 110, the descending link 130 may be hinge-connected to a second surface of the hinge arm 120 that may be an opposite side and the second surface of the hinge bracket 110. For example, the hinge connection between the hinge bracket 110, the support link 140 and the hinge arm 120, may be a pin coupling scheme that may be used for the general link coupling and the pin coupling scheme may also be applied to the hinge connection between the descending link 130 and the hinge arm 120.

However, the lower end portion of the descending link 130 may be coupled to the descending pin 160 to be supported to the hinge bracket 110 through the descending pin 160. In particular, the hinge bracket 110, the hinge arm 120, the descending link 130, and the support link 140 may be configured to include a 4 bar link mechanism for the hinge connection between the hood and the vehicle body and the hood opening and closing operation.

Referring to FIGS. 3A-3B, the hinge arm 120 may be coupled with the hood (not illustrated), the descending link 130 may be an intermediate connection link, and the support link 140 may be horizontally arranged when the hood is disposed in a closing state. In particular, the hinge arm 120 coupled with the hood may also be disposed in an approximately horizontal direction.

Conversely, when the hood is opened, the descending link 130 and the support link 140 may be rotated upward with respect to the lower hinge bracket 110 based on the lower end portion. In particular, the hinge arm 120 may also be rotated toward a vertical position (e.g., upward) based on the rear end portion. For example, the rotating descending link 130 may support the rear end portion that rotates center of the hinge arm 120. Namely, the descending link 130 may support the rear end portion of the hinge arm 120 so that the hinge arm 120 traverses along an arc trajectory upon rotation of the descending link 130. Ultimately, the hinge arm 120 may be disposed in a maximally erected state as illustrated in FIG. 3 in the hood opening state. When the hinge arm 120 reaches a maximum rotating position (e.g., position where the hood is maximally open), the support link 140 maybe configured to restrict the hinge arm 120 and the hinge arm 120 is no longer rotated upward and limit the opening of the hood.

Furthermore, the hinge bracket 110 may include a pin regulation aperture 111 that extends laterally and that may be formed therein and the descending pin 160 may be configured to penetrate through the pin regulation aperture 111 to be coupled with the pin regulation aperture 111. Further, an upper portion of the pin regulation aperture 111 may include a neck component 111a to allow the descending pin 160 positioned at the upper portion at ordinary times to be locked to the lower portion. The width of the pin regulation aperture 111 at the lower portion of the neck component may increase toward the distal direction.

The neck component 111a may be formed to have a shape which protrudes inwardly from the pin regulation aperture 111. The width of the pin regulation aperture 111 at a portion where the neck component 111a is formed may be narrower than other portions of the upper portion and the lower portion thereof. The neck component 111a may be configured to restrict and support the descending pin 160 to prevent the descending pin 160 positioned at the upper portion at ordinary times in the pin regulation aperture 111 from being displaced in a downward direction by the locking action of the descending pin 160.

As described above, the descending pin 160 may be coupled to the neck component 111a and thus, the position of the descending pin 160 may be fixed at the upper portion. For example, the locked (e.g., fixed) position of the descending pin 160 may be fixed at the upper portion of the pin regulation aperture 111 and may be coupled to allow the descending pin 160 to translate in a downward orientation. In particular, when the neck component 111a has a narrow aperture width, the narrow aperture may be deformed and be the locked by a friction force of an edge portion of the pin regulation aperture of the hinge bracket 110 and the descending pin 160. In other words, the descending pin 160 may be disposed (e.g., fitted) in the upper portion of the pin regulation aperture 111 and may be configured to maintain a position by the friction force. When a downward force that exceeds the friction force is applied to the descending pin 160, the descending pin 160 may be configured to descend toward a wider width portion of the aperture.

Further, the hinge bracket 110 may include a bending lever 150 coupled between the descending pin 160 and the hinge bracket 110. The bending lever 150 may be configured to fasten a lower fastening component 151 with a bottom plate 112 of the hinge bracket 110. An intermediate portion 152 of the bending lever 150 may be coupled with a vertical plate 113 of the hinge bracket 110 that may extend in a vertical direction from the bottom plate by a pin 153.

The position of the bending lever 150 at the hinge bracket 110 may be adjusted based on a toleration, a gap from other components, a step, or the like upon the manufacturing. Namely, a height of the fastening component 151 of the bending lever 150 at the bottom plate 112 of the hinge bracket 110 may be disposed to be adjusted. For example, an adjust bolt 154 may be configured to penetrate through the bottom plate 112 of the hinge bracket 110 to be screw-connected thereto. In other words, when the fastening component 151 of the bending lever 150 is fixed to a body of the adjust bolt 154 to be configured to rotate the adjust bolt 154, the height of the fastening component 151 may be adjusted at the bottom plate 112 of the hinge bracket 110.

Further, as described above, the upper end portion of the bending lever 150 may be coupled with the descending pin 160. The descending pin 160 may be configured to protrude toward a side surface from the bending lever 150 and may be configured to be pressed by the hinge arm 120 to a position with a greater degree of extension than in the hood closing state of when the pedestrian crashes into the hood. The hinge arm 120 may include a pressing end 121 that may be configured to press the descending pin 160. In this case, the upper portion of the bending lever 150 may be portion that extends from the intermediate portion 152 of the bending lever 150 to the upper end portion of the bending lever 150 and may be disposed in an inclined direction. A first side of the upper portion between the intermediate portion 152 of the bending lever 150 and the upper end portion may include a bent portion 155.

The bent portion 155 may be formed upon reduction of a width of the bending lever 150. When the descending pin 160 with which the upper end portion of the bending lever 150 may be coupled to, descends in the pin regulation aperture 111, the upper portion may be bent downward based on the bent portion 155. The bent portion 155 of the bending lever 150 may be bent downward when the descending pin 160 applies a load over a predetermined level to the bent portion 155. In other words, the bending may occur at the bent portion 155 or the bending and some fracture or the whole fracture may occur at the bent portion 155. As described above that the width of the bending lever 150 may be reduced at the bent portion 155, but the thickness of the bending lever 150 as well as the width of the bending lever 150 may be formed thinner than other portions at the portions when the bent portion 155 is formed.

Additionally, the bottom plate 112 of the hinge bracket 110 may include a buffer bracket 170 that may be deformed by the contact and the pressure of the descending pin 160 that descends to absorb an impact. The buffer bracket 170 may be fixedly disposed to be positioned at the lower portion of the descending pin 160 and may be made of a board bent to have approximately a convex shape may have a flat top surface and two sides that extend perpendicular in a downward direction from the flat top surface. Further, flanges may extend in a perpendicular direction from each of the bottom surfaces. (e.g., '⊓') shape. The buffer bracket 170 may be made of a metal material and both left and right lower end portions may be fastened to the bottom plate 112 of the hinge bracket 110 by a bolt 171, or the like. The buffer bracket 170 may operate as a damper configured to absorb an impact by the above-mentioned deformation and may have a damping constant that may be adjusted by the appropriate selection of a thickness, a shape, and a material. Accordingly, the configuration of the passive hood hinge system according to the exemplary embodiment of the present invention is described and therefore the operation state thereof will be described below.

Referring to FIGS. 3A and 3B, the hinge arm 120 may be disposed at an approximate horizontal arrangement in the hood closing state. The hinge arm 120 may extend in the upward rotated state in the hood opening state. The hood closing state and the hood opening state illustrated in FIGS. 3A and 3B are an operation state based on the opening and closing of the hood during normal operation of the vehicle. For example, when the hood is opened in the hood closing state, the hinge arm 120, the descending link 130, and the support link 140 may be configured to be rotated upward and thus the hood may be in the opening state. When the hood is closed, the hinge arm 120, the descending link 130, and the support link 140 may be configured to be rotated downward and thus the hood may be in the closing state.

In FIG. 3A, the hood closing state becomes the pre-operation state in which the pedestrian crash does not occur. FIGS. 4 and 5 illustrate an impact absorbing operation that reduce an impact and an injury value may be applied to a pedestrian upon impact with the hood. The position of the descending pin 160 in the hood closing state of FIG. 3A may be primarily fixed by the bending lever 150 and then the descending pin 160 may be locked to the neck component 111*a* of the pin regulation aperture 111. In particular, the position of the descending pin 160 may be secondarily fixed by the neck component 111*a*. In the pre-operation state as described above, the position of the descending pin 160 may be fixed by the bending lever 150 and the neck component 111*a* of the pin regulation aperture 111 to increase the locking stability by the primary and secondary double locking structure. In other words, prior to impact, unless the impact load due to the pedestrian crash is applied through the hood and hinge arm 120, the safe locking structure in which the operation of the bending lever 150 and the descending pin 160 is not made may be implemented.

Further, the intermediate portion 152 of the bending lever 150 may be coupled with the hinge bracket 110 through the pin when the fastening component 151 of the bending lever 150 is fixed to the hinge bracket 110. Accordingly, the intermediate portion 152 of the bending lever 150 may become a fixed support point upon the bending deformation of the bending lever 150. When the pedestrian crash occurs in the pre-operation state as described above, the impact load may be applied to the hinge arm 120 through the hood to descend and the pressing end 121 of the hinge arm 120 may be configured to press the descending pin 160 in a downward direction. In other words, the bent portion 155 of the bending lever 150 may be unlocked while being bent downward by the force applied to the descending pin 160 and the descending pin 160 may be configured to pass downward through the neck component 111*a* of the pin regulation aperture 111.

The descending pin 160 that is descending as described above may be configured to press the upper portion of the buffer bracket 170, such that the buffer bracket 170 absorbs the impact while being deformed. In particular, energy may be lost due to the damping and deformation of the buffer bracket 170 and therefore the impact applied to the pedestrian may be reduced. Further, the descending link 140 coupled with the descending pin may also descend upon the dissension of the descending pin 160.

By this configuration, the passive hood hinge system according to the exemplary embodiment of the present invention may use the buffer bracket 170 as the damping element to perform the buffer action instead of the existing spring. In particular, the buffer bracket 170 may be pre-assembled in the hinge bracket 110 in the assembly form, thereby solving several problems due to the application of the spring. Namely, the problems of the increase in the volume and size, the increase in the costs and weight, the reduction in workability due to the separate assembling of the spring, the mass production limitations, etc may be resolved or improved.

By this configuration, the passive hood hinge system according to the embodiment of the present invention may use the buffer bracket as the damping element performing the buffer action instead of the existing spring, in particular, the buffer bracket that may be pre-assembled in the hinge bracket in the assembly form, thereby solving several problems due to the application of the spring, that is, the problems of the increase in the volume and size, the increase in the costs and weight, the reduction in workability due to the separate assembling of the spring, the mass production limitations, etc.

Further, the position of the descending pin may be fixed by the bent lever and the neck portion of the pin regulating aperture before the crash, thereby increasing the lock stability due to the double fixing structure as described above.

The invention has been described in detail with reference to exemplary embodiments thereof. However, it will be appreciated by those skilled in the art that the scope of the present invention is not limited to the exemplary embodiments as mentioned above and that changes may be made in these exemplary embodiments without departing from the principles and spirit of the invention, the scope of which is defined in the appended claims and their equivalents.

What is claimed is:

1. A passive hood hinge system for a vehicle, comprising:
   a hinge bracket coupled to a vehicle body and having a vertically formed pin regulation aperture;
   a hinge arm coupled with a hood;
   a descending link having a first end portion rotatably coupled with the hinge arm and a second end portion rotatably supported to the hinge bracket;
   a support link having a first end portion rotatably coupled with the hinge arm and a second end portion rotatably coupled with the hinge bracket;
   a bending lever disposed at the hinge bracket, with an upper end portion coupled with the descending pin coupled with the pin regulation aperture, and a bent portion configured to bend when the descending pin at the pin regulation aperture descends; and
   a buffer bracket disposed at a lower portion of the descending pin and configured to be deformed by the pressure of the descending pin,
   wherein the hinge arm is configured to press the descending pin by a load applied through the hood during a pedestrian crash, the descending pin is configured to descend while the bent portion of the bent lever bends and the buffer bracket is configured to absorb an impact while being deformed by the descending pin.

2. The passive hood hinge system of claim 1, wherein the second end of the descending link is rotatably coupled with the descending pin, the descending link to be displaced when the descending pin descends.

3. The passive hood hinge system of claim 1, wherein the pin regulation aperture includes a neck component to allow the descending pin disposed at an upper portion to be coupled to a lower portion.

4. The passive hood hinge system of claim 3, wherein the neck component protrudes inwardly from the pin regulation aperture, and the width of the pin regulation aperture at a portion where the neck component is formed is narrower than the upper portion and the lower portion of the pin regulation aperture.

5. The passive hood hinge system of claim 3, wherein the width of the pin regulation aperture at the lower portion increases as the pin regulation aperture extends in a distal direction.

6. The passive hood hinge system of claim 5, wherein the descending pin is configured to maintain a fixed position by a locking action due to friction force when the descending pin is fitted in the upper portion of the pin regulation aperture and the descending pin is compressed by the hinge arm during the pedestrian crash, the descending pin is configured to descend toward the lower portion.

7. The passive hood hinge system of claim 1, wherein the bending lever includes: a lower fastening component coupled to a bottom plate of the hinge bracket; an intermediate portion coupled with a vertical plate of the hinge bracket by a pin; and an upper portion disposed in an inclined orientation, wherein the upper portion extends from the intermediate portion to the upper end portion being coupled with the descending pin, in which a first side of the upper portion disposed in the inclined direction includes the bent portion.

8. The passive hood hinge system of claim 7, wherein an adjust bolt is configured to penetrate through the bottom plate of the hinge bracket to be coupled thereto and a body of the adjust bolt is coupled to a fastening component of the bending lever to adjust a height of the fastening component from the bottom plate of the hinge bracket upon rotation of the adjust bolt.

9. The passive hood hinge system of claim 1, wherein the bent portion is formed by reduction of the width of the bending lever.

10. The passive hood hinge system of claim 9, wherein a thickness of the bending lever at the portion where the bent portion is formed is less than the thickness of other portions of the bending lever.

11. The passive hood hinge system of claim 1, wherein the buffer bracket is made of a board bent to have a convex shape with the lower end portions of both left and right sides are fixed to the bottom plate of the hinge bracket and an upper portion is pressed by the descending pin.

* * * * *